United States Patent
Gmach et al.

(10) Patent No.: US 9,178,763 B2
(45) Date of Patent: Nov. 3, 2015

(54) WEIGHT-BASED COLLOCATION MANAGEMENT

(71) Applicant: Hewlett-Packard Development Company, L.P., Houston, TX (US)

(72) Inventors: Daniel Juergen Gmach, Palo Alto, CA (US); Sergey Blagodurov, Burnaby (CA); Martin Arlitt, Calgary (CA); Yuan Chen, Sunnyvale, CA (US); Chris D. Hyser, Victor, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 188 days.

(21) Appl. No.: 13/800,304

(22) Filed: Mar. 13, 2013

(65) Prior Publication Data

US 2014/0282503 A1 Sep. 18, 2014

(51) Int. Cl.
*G06F 9/455* (2006.01)
*H04L 12/24* (2006.01)
*G06F 11/30* (2006.01)
*H04L 12/26* (2006.01)

(52) U.S. Cl.
CPC ........ *H04L 41/0823* (2013.01); *G06F 9/45558* (2013.01); *G06F 11/30* (2013.01); *G06F 2009/45591* (2013.01); *H04L 43/045* (2013.01)

(58) Field of Classification Search
CPC ... H04L 41/0823; H04L 43/045; G06F 11/30; G06F 9/45558; G06F 2009/45591
See application file for complete search history.

(56) References Cited

U.S. PATENT DOCUMENTS

| 7,668,703 | B1 * | 2/2010 | Rolia et al. ........................ 703/2 |
| 7,761,875 | B2 | 7/2010 | Karamanolis et al. |
| 8,032,882 | B2 * | 10/2011 | Gupta et al. ..................... 718/1 |
| 8,095,929 | B1 * | 1/2012 | Ji et al. ............................ 718/1 |
| 8,103,486 | B1 * | 1/2012 | Rolia et al. ........................ 703/2 |
| 8,108,857 | B2 * | 1/2012 | Tylutki et al. .................... 718/1 |
| 8,146,079 | B2 * | 3/2012 | Gupta et al. ..................... 718/1 |
| 8,214,838 | B2 * | 7/2012 | Cherkasova et al. .......... 718/104 |
| 8,301,742 | B2 | 10/2012 | Hanson et al. |
| 2002/0174227 | A1 | 11/2002 | Hartsell et al. |
| 2008/0028076 | A1 * | 1/2008 | Gupta et al. .................. 709/226 |
| 2008/0028397 | A1 * | 1/2008 | Gupta et al. ..................... 718/1 |
| 2008/0270595 | A1 * | 10/2008 | Rolia et al. .................... 709/224 |
| 2012/0222042 | A1 | 8/2012 | Chess et al. |
| 2013/0007761 | A1 | 1/2013 | O'Sullivan et al. |

OTHER PUBLICATIONS

"Resource Management Guide: ESX Server 3.0.1 and VirtualCenter 2.0.1", VMWARE, 2006.

(Continued)

*Primary Examiner* — Van Nguyen
(74) *Attorney, Agent, or Firm* — Mannava & Kang, P.C.

(57) ABSTRACT

According to an example, an application performance measurement for an application for a current time interval, a performance specification for the application, and a resource consumption metric for a resource of a plurality of resources that are to process the application for the current time interval may be accessed. In addition, the application performance measurement, the performance specification, and the resource consumption metric may be used to determine a resource specification for a next time interval for the resource of the plurality of resources. Moreover, the resource specification may be used to determine, by a processor, a resource weight for the resource of the plurality of resources for the next time interval.

18 Claims, 10 Drawing Sheets

(56) References Cited

OTHER PUBLICATIONS

Lin, Bin, et al., "VSched: Mixing Batch and Interactive Virtual Machines Using Periodic Real-time Scheduling", Department of Computer Science, Northwestern University, 2005.

Nathuji, Ripal, et al., "Q-Clouds: Managing Performance Interference Effects for QoS-Aware Clouds", 2010.

Schermerhorn, Lee T., "Automatic Page Migration for Linux [A Matter of Hygiene]", Linux conference AU, Sydney 2007.

Sudan, Kshitij, et al., "Optimizing Datacenter Power with Memory System Levers for Guaranteed Quality-of-Service", Sep. 19-23, 2012. <http://www.cs.utah.edu/~rajeev/pubs/pact12.pdf>.

Sukwong, Orathai, et al., "SageShift: Managing SLAs for Highly Consolidated Cloud", 2012.

* cited by examiner

WEIGHT-BASED COLLOCATION MANAGEMENT

BACKGROUND

In computing, virtualization is often used to create a virtual version of a hardware platform, an operating system (OS), storage devices, or network resources. Virtualization is also often used to improve the effective utilization of a server's physical resources. A variety of techniques have been used to manage virtual resources. For example, virtual resources, such as virtualized data centers, have been managed by using non-work conserving or work conserving approaches. For the non-work conserving approach, each workload is provided with restricted access to resources that can be used per time interval. The non-work conserving approach may be referred to as a resource capped mode. Thus, for the non-work conserving approach, in order to guarantee workload isolation, the sum of the caps for each resource are set to be less than the overall available capacity for all resources. For the work-conserving mode, a workload may use the excess capacity that is not used by other workloads. The work-conserving approach may be referred to as a non-capped mode. Compared to the non-work conserving approach, the work conserving approach often leads to higher resource utilization.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
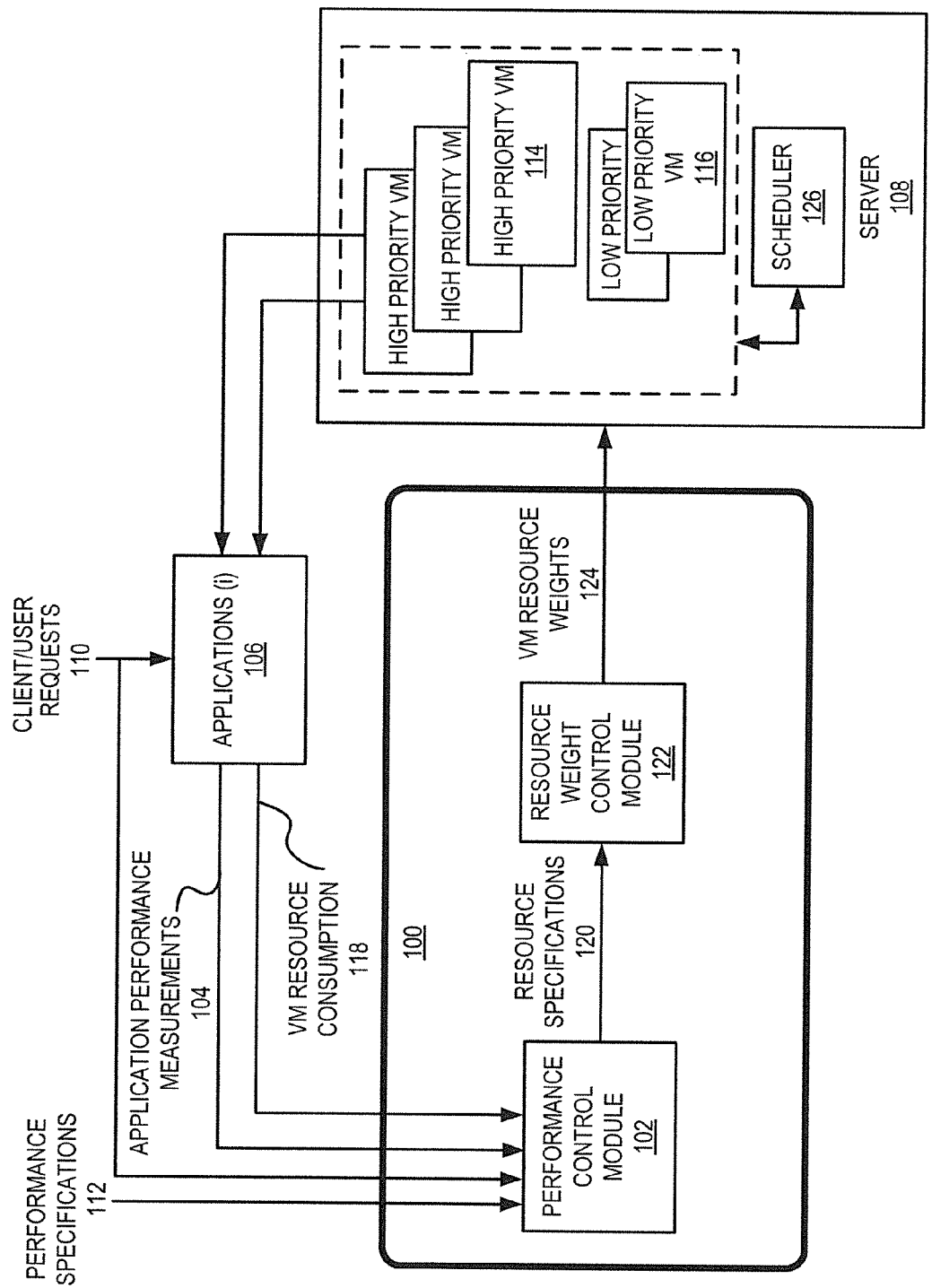
FIG. 1 illustrates an architecture of a weight-based collocation management apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

The increase in digital services may directly impact the demand for data center computing and the global power consumption of data centers. Despite this significant demand for computational resources, servers in data centers often tend to be under-utilized. This may lead to inefficiencies in power utilization, for example, as servers may use a disproportionate amount of power when idle compared to busy periods. Low resource utilization may also contribute to over-provisioning of information technology (IT) equipment and increased capital expenditures.

Virtualization may be used, for example, to improve the effective utilization of a server's physical resources in data centers. Virtual resources may be managed, for example, by using non-work conserving or work conserving approaches. For such virtual resources, enforcing caps for the non-work conserving approach may lead to low average resource utilization. Compared to the non-work conserving approach, although the work conserving approach (i.e., non-capped mode) may lead to higher resource utilization, the higher resource utilization may be based on the elimination of resource access guarantees. Such virtualization management techniques may provide limited balance between effective server utilization and meeting service level agreements (SLAs). For example, workload consolidation may be used to manage the number of workloads that may be hosted on a server. However, workloads generally, and in particular high priority workloads may be highly dynamic in their resource demands. This dynamic demand characteristic may lead to a sub-optimal solution that does not provide isolation between high priority workloads. For example, bursty workloads may heavily impact the performance of other workloads.

According to an example, a weight-based collocation management apparatus and a method for weight-based collocation management are disclosed herein. The apparatus and method disclosed herein may generally manage the collocation of high priority (e.g., user interactive) and low priority (e.g., batch) workloads, for example, on virtualized multicore servers. The apparatus and method disclosed herein may provide for improvement in server utilization while meeting the SLAs of high priority workloads by prioritizing resource access using resource weights, such as central processing unit (CPU) weights. For the virtualized environment, the CPU weights may be determined as virtual machine (VM) resource weights. In other environments, such as a LINUX environment, the CPU weights may be determined as LINUX control group (cgroup) weights. The apparatus and method disclosed herein may provide for approximately 100% resource utilization, while maintaining any performance loss of high priority workloads within specified limits.

The apparatus and method disclosed herein may generally manage performance of high priority workloads when system utilization is high via dynamically controlled resource weights, such as CPU weights. Maintaining performance at higher utilization levels may provide for increased efficiency of use of physical machines by consolidating more workloads onto each server. For the apparatus and method disclosed herein, workload performance may be managed based on either a fairness technique or an isolation technique. For the fairness technique, resource weights may be adjusted based on application performance, such as response time. Thus, two applications with similar SLAs may have an equal chance of achieving their SLA goals. For the isolation technique, the apparatus and method disclosed herein may consider performance SLAs with a specified maximum load for each application, e.g., a maximum request rate. The resource weights may be assigned based on the fairness technique as long as request rates stay at or below an agreed maximum load per a SLA. If the request rate of an application exceeds the maximum load per the SLA, then the particular application may receive lower resource weights in order to reduce the impact on other applications.

According to an example, the method for weight-based collocation management may include accessing an application performance measurement for an application for a current time interval, accessing a performance specification for the application, and accessing a resource consumption metric for a resource of a plurality of resources that are to process the application for the current time interval. The method for weight-based collocation management may further include using the application performance measurement, the performance specification, and the resource consumption metric to determine a resource specification for a next time interval for the resource of the plurality of resources. The method for weight-based collocation management may further include using the resource specification to determine a resource weight for the resource of the plurality of resources for the next time interval.

For the apparatus and method disclosed herein, high priority and low priority workloads may be collocated, and shared resources may be dynamically allocated for all workloads. SLAs may be preserved when bursty high priority workloads share resources. Fairness may be achieved between high priority workloads via dynamic management of resource weights, such as CPU weights. The fairness may be achieved between high priority workloads even when multiple bursty high priority workloads contend for resources. Further, performance isolation may be achieved between high priority workloads via dynamic management of resource weights. The performance isolation may be achieved between high priority workloads when multiple high priority and low priority workloads contend for resources. The resource weights may be automatically calculated based on performance and workload resource specifications. The apparatus and method disclosed herein may thus provide for higher resource utilization while still maintaining performance goals. Further, the apparatus and method disclosed herein may provide for the configuration of resource weights for a set of workloads based on performance and resource consumption. The apparatus and method disclosed herein may also be applied to management of other resources, such as network resources, input/output resources, etc.

FIG. 1 illustrates an architecture of a weight-based collocation management apparatus 100, according to an example. Referring to FIG. 1, the apparatus 100 is depicted as including a performance control module 102 to receive application performance measurements 104 for applications 106 that operate using a server 108. The applications 106 may include a performance monitor (not shown) to determine the application performance measurements 104. The applications 106 may be designated as applications i. The applications 106 may receive requests 110 (e.g., search queries) from clients or users thereof. The requests 110 may be used as a basis for determining the application performance measurements 104, for example, as a determined response time for the requests 110. The performance control module 102 may further receive performance specifications 112 (e.g., as specified in SLAs) for the applications 106. The server 108 may include a plurality of high priority VMs 114 and a plurality of low priority VMs 116. The high priority VMs 114 may be used for high priority workloads (e.g., user interactive workloads) for the applications 106, and the low priority VMs 116 may be used for low priority workloads (e.g., batch workloads). The performance control module 102 may further receive VM resource consumption 118 for the high priority VMs 114 from the server 108. The performance control module 102 may use the application performance measurements 104, the performance specifications 112, and the VM resource consumption 118 to determine resource specifications 120 for each of the high priority VMs 114 of the server 108. A resource weight control module 122 may use the resource specifications 120 to determine VM resource weights 124 for each of the high priority VMs 114 of the server 108. The server 108 may further include a scheduler 126 to monitor and control the high priority VMs 114 based on the VM resource weights 124. For example, the scheduler 126 may control the high priority VMs 114 to process high priority workloads for the applications 106 based on the VM resource weights 124, and otherwise use the low priority VMs 116 to process low priority workloads.

The modules 102 and 122, and other components of the apparatus 100 that perform various other functions in the apparatus 100, may include machine readable instructions stored on a non-transitory computer readable medium. In addition, or alternatively, the modules 102 and 122, and other components of the apparatus 100 may include hardware or a combination of machine readable instructions and hardware.

For the weight-based collocation management apparatus 100, each of the applications i may be assigned a SLA that specifies a desired response time SLA (RTSLA). Each of the VMs of the server 108 may include an associated value (e.g., weight) that defines a VM's share of the resources of the server 108. The associated value for each VM may directly correspond to a fraction of the CPU time for the server 108. For example, a higher associated value for a VM may correspond to a larger fraction of the CPU time for the server 108, and vice versa. The scheduler 126 may monitor and control the VMs 114, 116, in a work-conserving manner. For example, the scheduler 126 may control a VM of the server 108 such that the VM may use more than its share of the total CPU time if idle CPU cycles are available.

In order to determine the VM resource weights 124, the performance control module 102 may first determine the resource specifications 120 (e.g., CPU allocation values) for each workload related to the applications 106 in a next control interval based on current workload performance and resource consumption (e.g., CPU consumption). The performance control module 102 may translate the resource specifications 120 to VM resource weights 124 (e.g., CPU weights) for a virtualized system. As shown in FIG. 1, the weight-based collocation management apparatus 100 may use a feedback control technique for the performance control module 102. Those skilled in the art would appreciate in view of this disclosure that other control types, such as, feed-forward controllers, or other types of feedback control techniques may be used with the performance control module 102.

Figure 2:
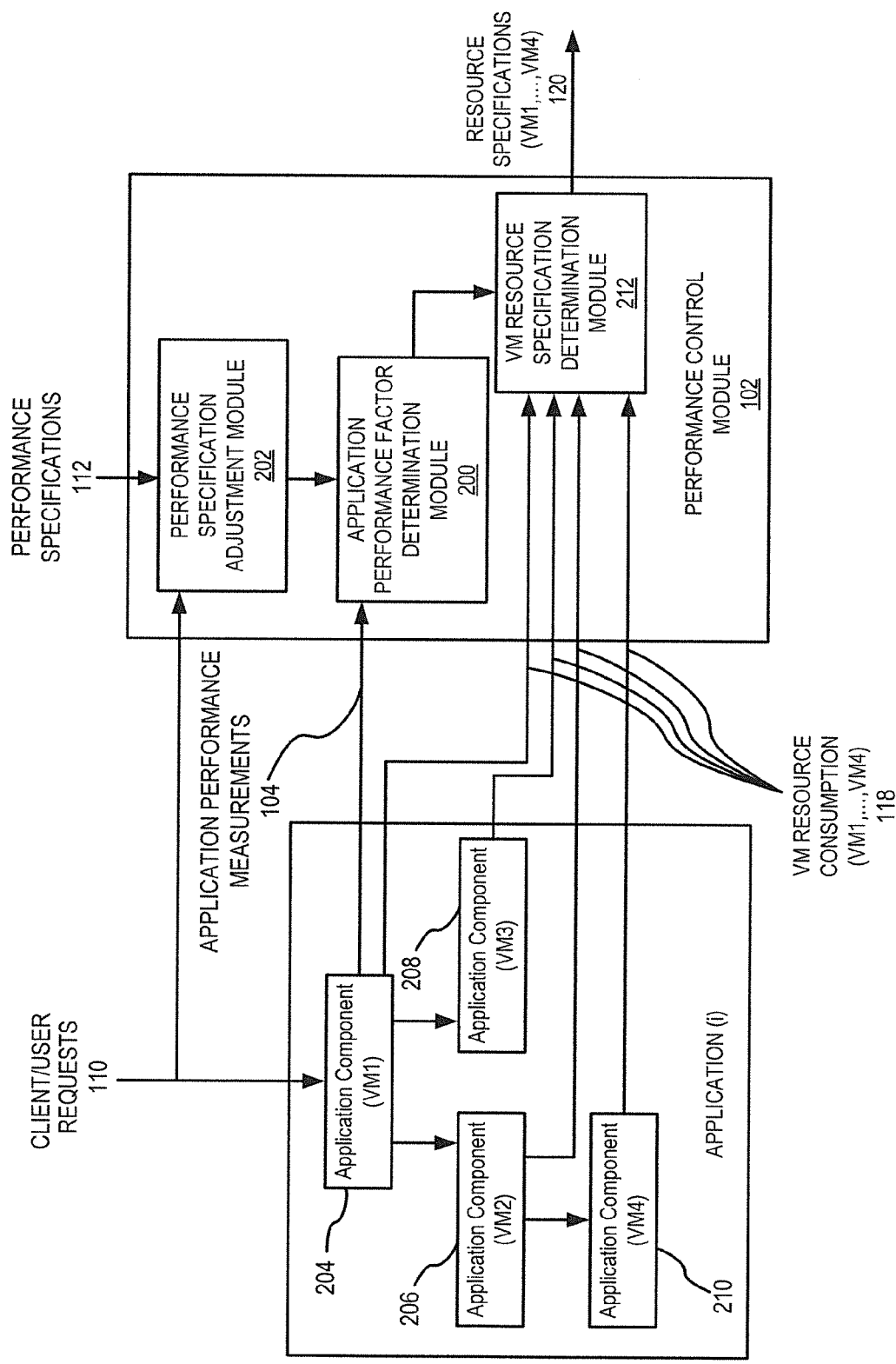
FIG. 2 illustrates a performance control module of the weight-based collocation management apparatus, according to an example of the present disclosure.

Referring to FIGS. 1 and 2, FIG. 2 illustrates further details of the performance control module 102, according to an example of the present disclosure. The performance control module 102 may include an application performance factor (PF) determination module 200 to determine whether an application has met its performance specification, and if not, by how much the application has missed the performance specification. Specifically, the application PF determination module 200 may determine a PF for each high priority application i as follows:

$$PF_i(t) = \frac{RT_i(t) - RT_i^{SLA}}{RT_i^{SLA}} \qquad \text{Equation (1)}$$

For Equation (1), $RT_i(t)$ may represent a monitored response time of the application in a current time interval t (e.g., 5 seconds, 10 seconds, etc.), and $RT_i^{SLA}$ may represent a response time specification per a SLA associated with the application i. As discussed in further detail below, a performance specification adjustment module 202 may forward a $RT_i^{SLA}$ per a SLA associated with the application i to the application PF determination module 200 if a high priority application i stays within a maximum request rate (e.g., see isolation technique below), or a large value that exceeds the $RT_i^{SLA}$ if a high priority application i exceeds the maximum request rate. Different metrics for response time may be used, such as average, $95^{th}$ percentile, or maximum response time per interval. The $PF_i(t)$ may range from −1 to +∞. For the $PF_i(t)$, a value below 0 may indicate that the application i exceeds its response time specification, a value below 0 may indicate that the application i meets its response time specification, and a value larger than 0 may denote by how much the application i misses the response time specification.

An application i of the applications 106 may include tiers j. For example, the application i of FIG. 2 is illustrated as including three tiers, respectively including tier-1 application component 204 processed by a VM1 (e.g., a VM of the high priority VMs 114), tier-2 application components 206, 208, respectively, processed by VM2 and VM3, and tier-3 application component 210 processed by a VM4. Thus, for the example of FIG. 2, the four application components may be processed by a dedicated VM. The application component 204 may represent a user facing component that includes a performance monitor to monitor and provide the application performance measurements 104.

The performance control module 102 may further include a VM resource specification determination module 212 to determine how many CPU resources should be allocated to each VM in a next time interval based on a current associated PF and VM resource consumption 118 (e.g., CPU consumption). For the example application i of FIG. 2, the VM resource specification determination module 212 may determine the resource specifications 120 for VMs 1-4 based on a current associated PF determined by the application PF determination module 200 for the application i and the VM resource consumption 118 for VMs 1-4. The resource specifications 120 may be determined as follows:

$$C_{i,j}(t+1) = C_{i,j}(t) \cdot (1 + PF_i(t)) \qquad \text{Equation (2)}$$

For Equation (2), $C_{(i,j)}(t)$ may represent the current CPU consumption of tier j of application i, and $C_{(i,j)}(t+1)$ may represent the desired CPU allocation for the next time interval t+1.

The resource weight control module 122 may convert the resource specifications 120 (e.g., desired CPU allocation values) into the VM resource weights 124 (e.g., CPU weights $W_{(i,j)}(t+1)$ as discussed below with reference to Equation (3)). The resource specifications 120 may be converted into the VM resource weights 124, for example, by using a linear model. In the event a physical server is fully utilized or overloaded, the VM resource weights 124 may be used to determine an amount of CPU each VM is able to access. Setting CPU weights in relation to desired resource specifications 120 (e.g., desired CPU allocation values) may provide each VM an identical probability of satisfying all of the demands thereof.

The resource weight control module 122 may convert the resource specifications 120 into the VM resource weights 124 as follows:

$$W_{i,j}(t+1) = (W^{max} - W^{min}) \cdot \frac{C_{i,j}(t+1)}{C^{max}(t+1)} + W^{min} \qquad \text{Equation (3)}$$

For Equation (3), $W_{i,j}(t+1)$ may represent the desired VM resource weights 124 (e.g., CPU weight) of application tier i,j for the next time interval (t+1), and $C^{max}(t+1)$ may represent the maximum desired resource specification (e.g., CPU specification) across all high priority application tiers. For the linear transformation model shown in Equation (3), $W^{max}$ may represent the available maximum VM resource weight (e.g., CPU weight value). For example, $W^{max}$ may be set to 256,000. Further, $W^{min}$ may represent a default resource weight, and may be set, for example, to 1,000. The resource weight control module 122 may therefore use Equation (3) to convert the resource specifications 120 into the VM resource weights 124 to provide higher utilization of the resources of the server 108 by providing for sharing of the resources of the server 108 between VMs. Further, the dynamic management of the resources of the server 108 may provide for management of the assignment of resources when various application components contend for physical resources. Thus, the weight-based collocation management apparatus 100 provides for the maintenance of performance goals even at high utilization levels of the resources of the server 108.

With respect to the low priority VMs 116, static weights (e.g., a weight of 2) may be used for the low priority VMs 116. Alternatively, dynamic weights may be assigned to the low priority VMs 116 based, for example, on performance. In order to provide higher access to physical resources for the high priority VMs 114, a lower band of weights may be chosen for the low priority VMs 116. For example, for the low priority VMs 116, $W^{min}$ may be set to 2, and $W^{max}$ may be set to 100. With respect to the low priority VMs 116, Equation (3) may be modified to account for the $W^{min}$ and $W^{max}$ specifications for the low priority VMs 116. For example, with respect to the low priority VMs 116, Equation (3) may be modified as follows:

$$W_{i,j}(t+1) = (W^{max} - W^{min}) \cdot \left(1 - \frac{c^{min(t+1)}}{c_{i,j}(t+1)}\right) + W^{min}$$

Further, with respect the low priority VMs 116, the low priority VMs 116 may be monitored and the performance thereof may be controlled by the performance control module 102 in a similar manner as discussed herein with respect to the high priority VMs 114. For a batch job, a performance metric may include, for example, progress towards termination of the batch job.

Figure 3A:
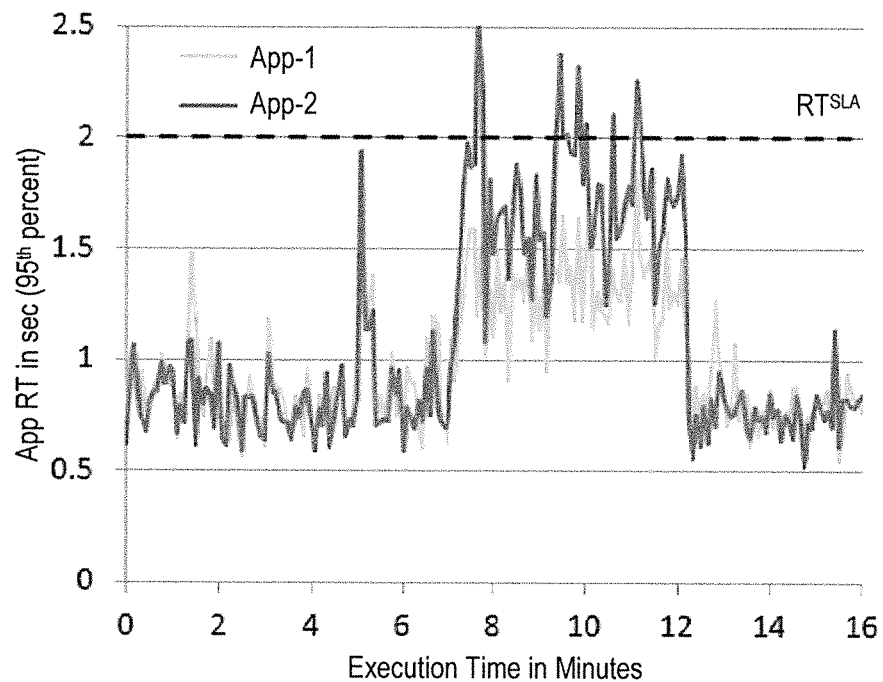
FIG. 3A illustrates application performance by assigning static CPU weights, and FIGS. 3B and 3C respectively illustrate operations of the weight-based collocation management apparatus to provide fairness for workload collocation during spikes, according to examples of the present disclosure.
Figure 3B:
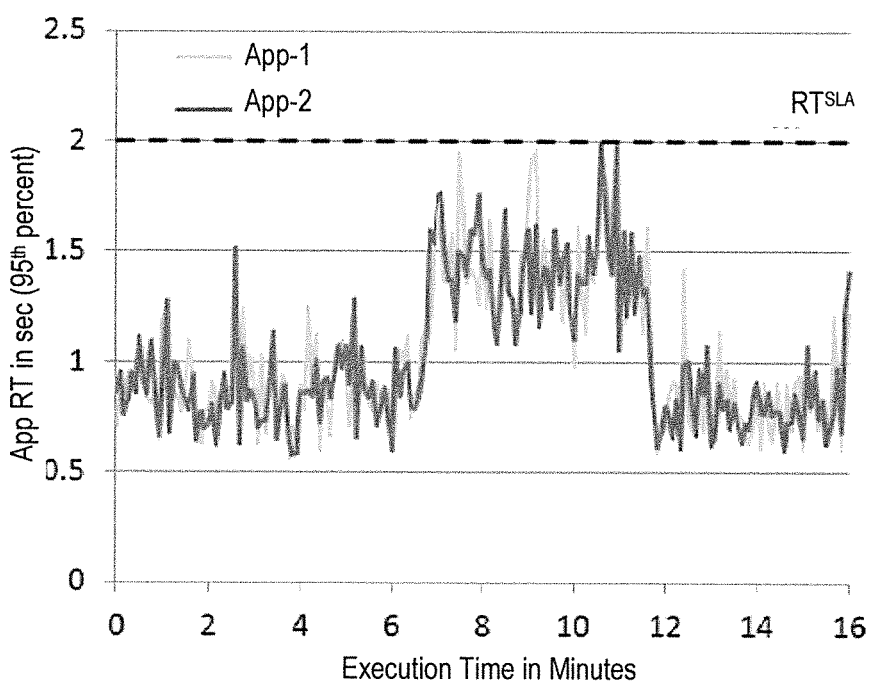
Figure 3C:
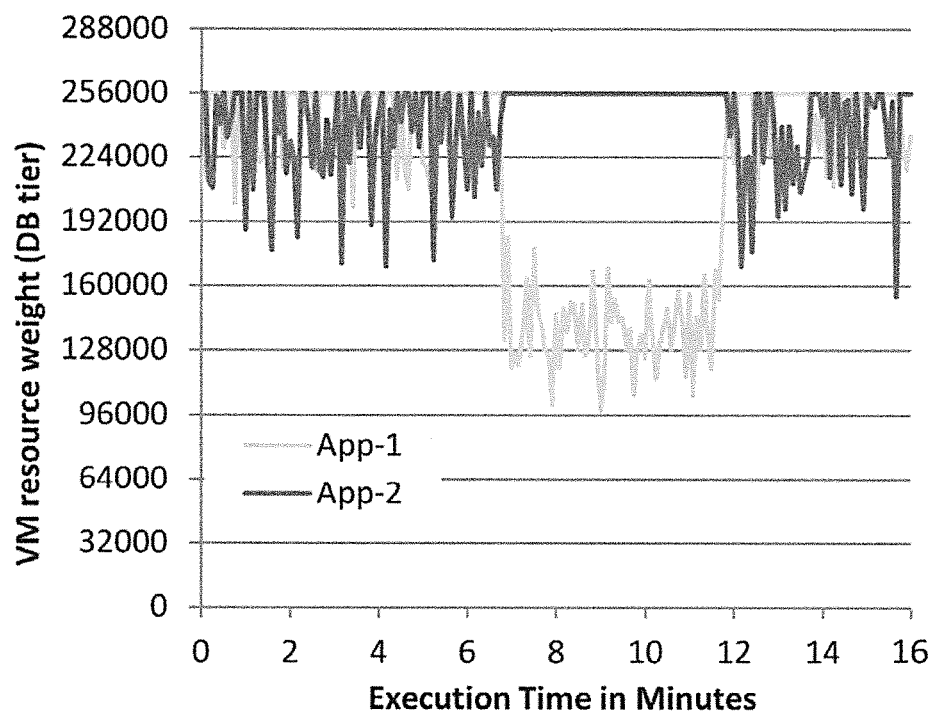

The VM resource weights 124 may be used by the scheduler 126 to provide fairness to the high priority workloads. Specifically, high priority workloads may be able to achieve a similar level of performance regardless of the user requests 110 (i.e., load). Referring to FIGS. 1, 2, and 3A-3C, FIG. 3A illustrates application performance by assigning static VM resource weights (e.g., CPU weights), and FIGS. 3B and 3C illustrate operation of the weight-based collocation management apparatus 100 to provide fairness for workload collocation during spikes in demand, according to an example of the present disclosure. For the example of FIGS. 3A-3C, the applications 106 may include App-1 and App-2, each including a performance specification 112 that specifies a $95^{th}$ percentile response time (RT) specification of 2 seconds. The applications 106 including App-1 and App-2 may include a default request rate, for example, of 20 requests/second, together with batch workloads and other network intensive jobs. Each application may utilize approximately 20% of the CPU resources of server 108. Referring to FIG. 3A, at approximately the 7 minute mark, App-2 may experience a 100% load increase for approximately 5 minutes. FIG. 3A shows the application performance by assigning static VM resource weights (e.g., a weight of 10,000 for App-1, a weight of 10,000 for App-2, and a weight of 2 for batch workloads). During the spike at the 5 minute mark, the performance impact on App-2 is higher than on App-1, which may result in a SLA violation for App-2. Further, from approximately the 7 minute to the 12 minute mark, static VM resource weights may result in App-2 exceeding the RT specification of 2.0 seconds.

FIG. 3B illustrates dynamic assignment of VM resource weights 124 by the scheduler 126 to provide fairness. For FIG. 3B, it may be seen that the applications 106 including App-1 and App-2 exhibit similar performance, compared to the static VM resource weight assignments of FIG. 3A. Compared to FIG. 3A, for FIG. 3B, during the spike at the approximately 5 minute mark, the VM resource weights 124 for App-1 decrease such that App-2 is able to achieve comparable performance. Further, both applications App-1 and App-2 perform within their response time specification of 2.0 seconds from approximately the 7 minute to the 12 minute mark. The VM resource weights 124 for App-1 and App-2 are shown in FIG. 3C.

Figure 4:
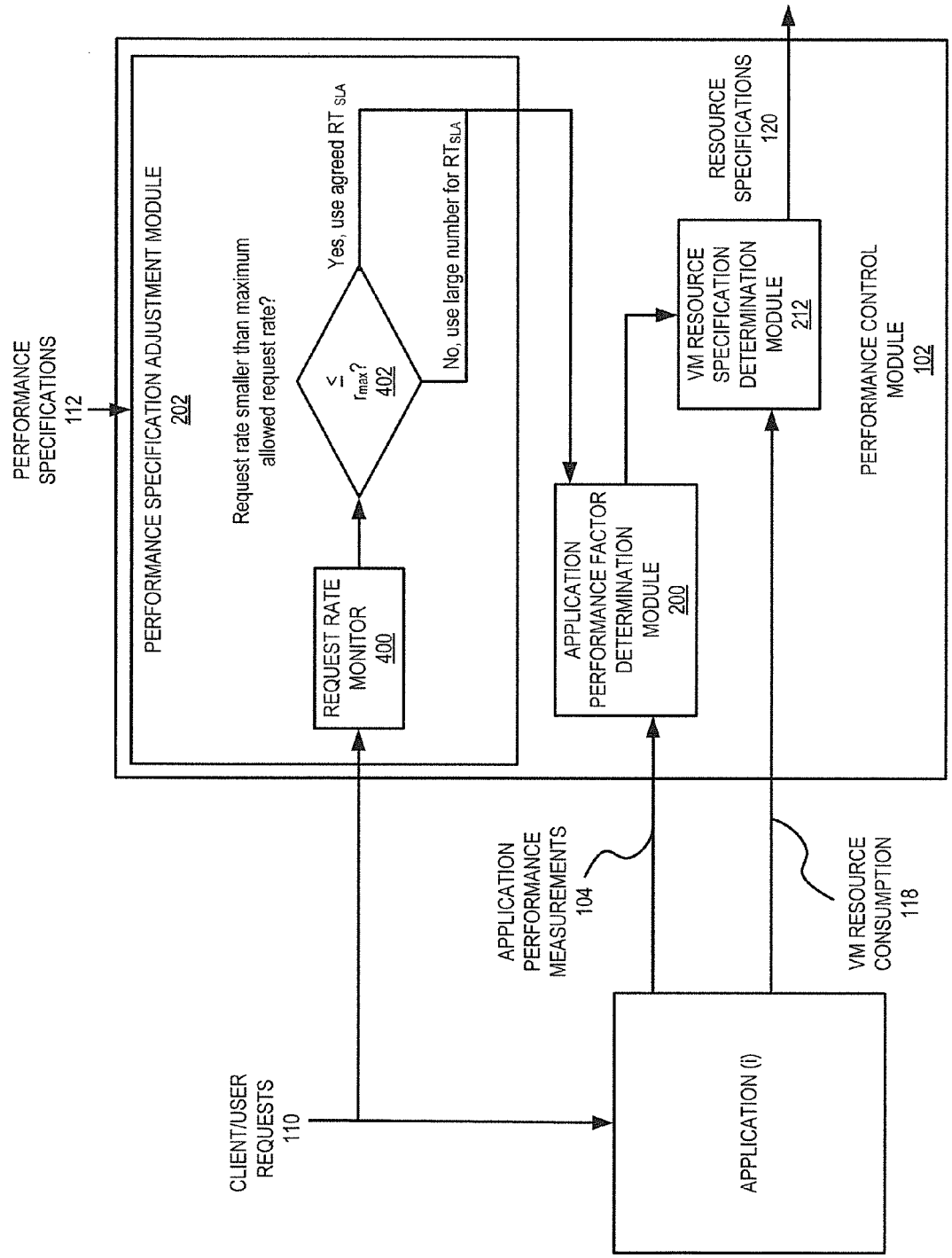
FIG. 4 illustrates service level agreement (SLA) based management of performance specifications, according to an example of the present disclosure.

Referring to FIGS. 1 and 4, FIG. 4 illustrates SLA based management of the performance specifications 112, according to an example of the present disclosure. Generally, the SLA based management of FIG. 4 may be provided by the performance specification adjustment module 202, which may forward a $RT_i^{SLA}$ per a SLA associated with the application i to the application PF determination module 200 if a high priority application i stays within a maximum request rate, or a large value that exceeds the $RT_i^{SLA}$ if a high priority application i exceeds the maximum request rate. The SLA based management of FIG. 4 may provide for workload isolation with dynamic prioritization. With respect to workload isolation, workloads that significantly increase their demands can take CPU resources from other workloads with a negative impact. The SLA based management of FIG. 4 may be used, for example, with a SLA that includes a performance specification (e.g., response time) that is restricted by a certain maximum load (e.g., maximum number of requests/second (i.e., $r_{max}$)). For example, referring to FIG. 4, a request rate monitor 400 may monitor the requests 110 for a high priority application i of the applications 106. For a given request rate $r_{max}$ at 402 (e.g., 30 requests/second), if a high priority application i exceeds the maximum request rate $r_{max}$, then the response time specification $RT_i^{SLA}$ in Equation (1) for the particular high priority application i may be increased to a large value by the performance specification adjustment module 202. This results in lower resource specifications 120 and thus lower VM resource weights (e.g., CPU weights). For a given request rate $r_{max}$ at 402, if a high priority application i stays within the maximum request rate $r_{max}$ (i.e., load for high priority application$\leq r_{max}$) then the response time specification $RT_i^{SLA}$ in Equation (1) for the particular high priority application i may be specified as the $RT_i^{SLA}$ by the performance specification adjustment module 202. Thus, if a high priority application i stays within the maximum request rate $r_{max}$, then the dynamic VM resource weights (e.g., CPU weights) may be assigned based on the fairness technique. Thus, the performance specification adjustment module 202 may dynamically adjust the performance specifications 112 based on the maximum request rate from a SLA.

Figure 5A:
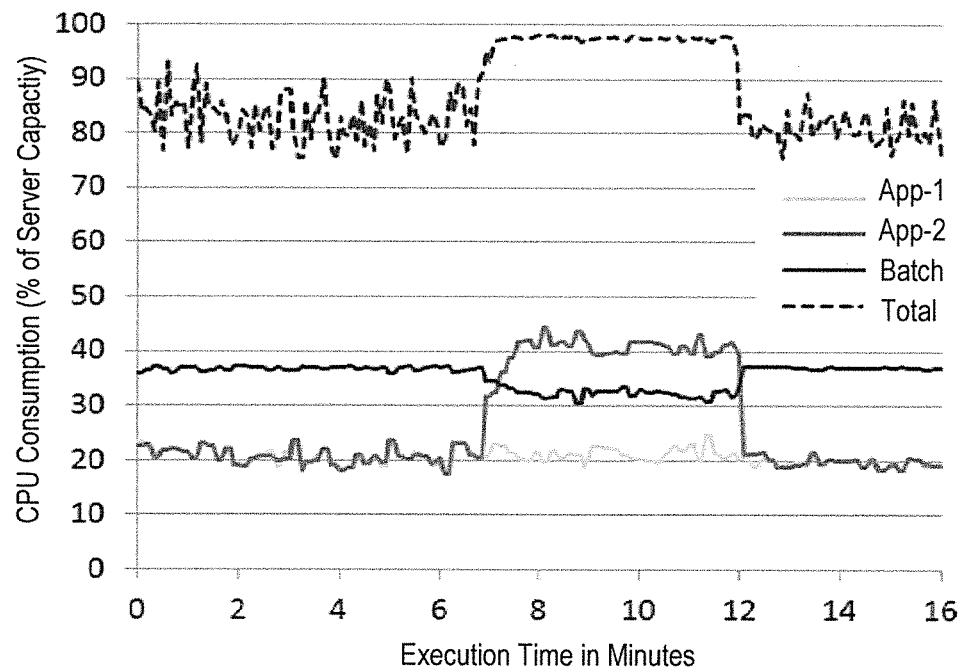
FIGS. 5A-5C respectively illustrate operations of the weight-based collocation management apparatus to provide isolation for workload collocation during spikes, according to examples of the present disclosure.
Figure 5B:
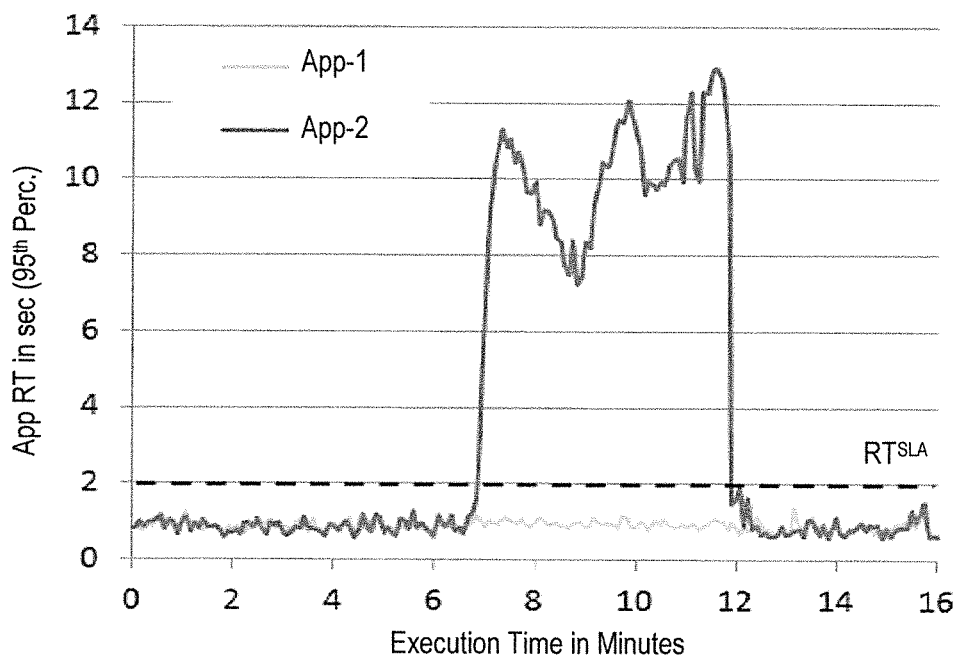
Figure 5C:
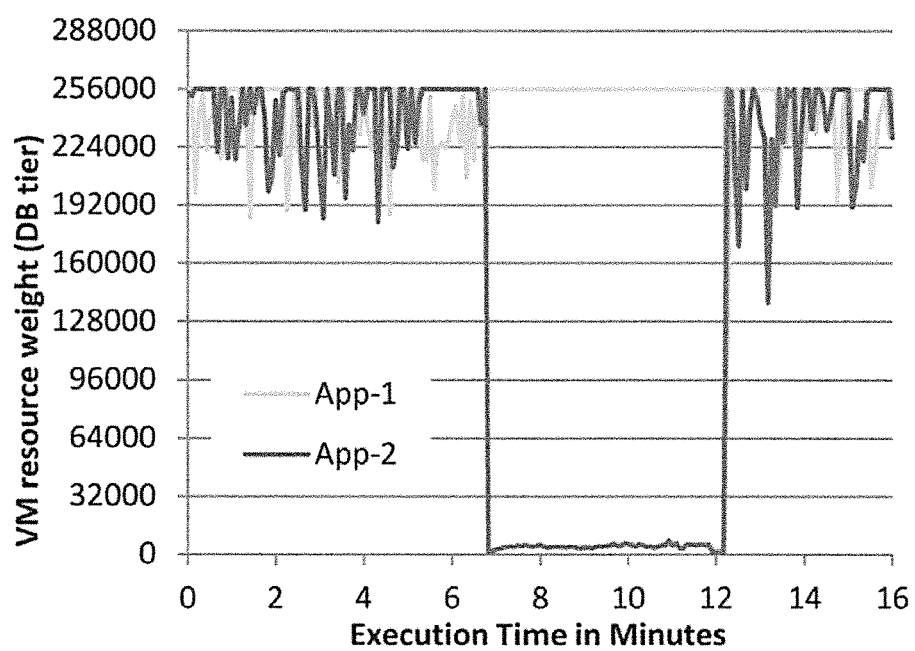

Referring to FIGS. 1-5C, FIGS. 5A-5C illustrate operation of the weight-based collocation management apparatus 100 to provide isolation for workload collocation during spikes, according to an example of the present disclosure. For example, FIG. 5A illustrates CPU consumption for an App-1, App-2, a batch job, and total CPU consumption. Referring to FIGS. 5A and 5B, assuming the maximum request rate $r_{max}$ for App-2 is 30 requests/second, when the load of App-2 exceeds 30 requests/second (e.g., at approximately the 7 minute mark) as determined by the request rate monitor 400, the response time specification for App-2 may be set to a million seconds (i.e., infinity for purposes of Equation (1)). Further, instead of response time specification for App-2 being set to a million seconds, the response time specification may include a plurality of steps of degradation. For example, the response time specification may be set to 1 minute if a request rate exceeds 30 requests/second, 10 minutes if the request rate exceeds 100 requests/second, etc. The performance control module 102 thus reduces the VM resource weights 124 (e.g., CPU weights) for App-2 as shown in FIG. 5C. By adjusting the VM resource weights 124, the performance control module 102 mitigates the performance impact on App-1 during the spike as shown in FIG. 5B. Further, the performance of App-2 drops significantly for the time App-2 exceeds the maximum allowed request rate $r_{max}$.

Figure 6:
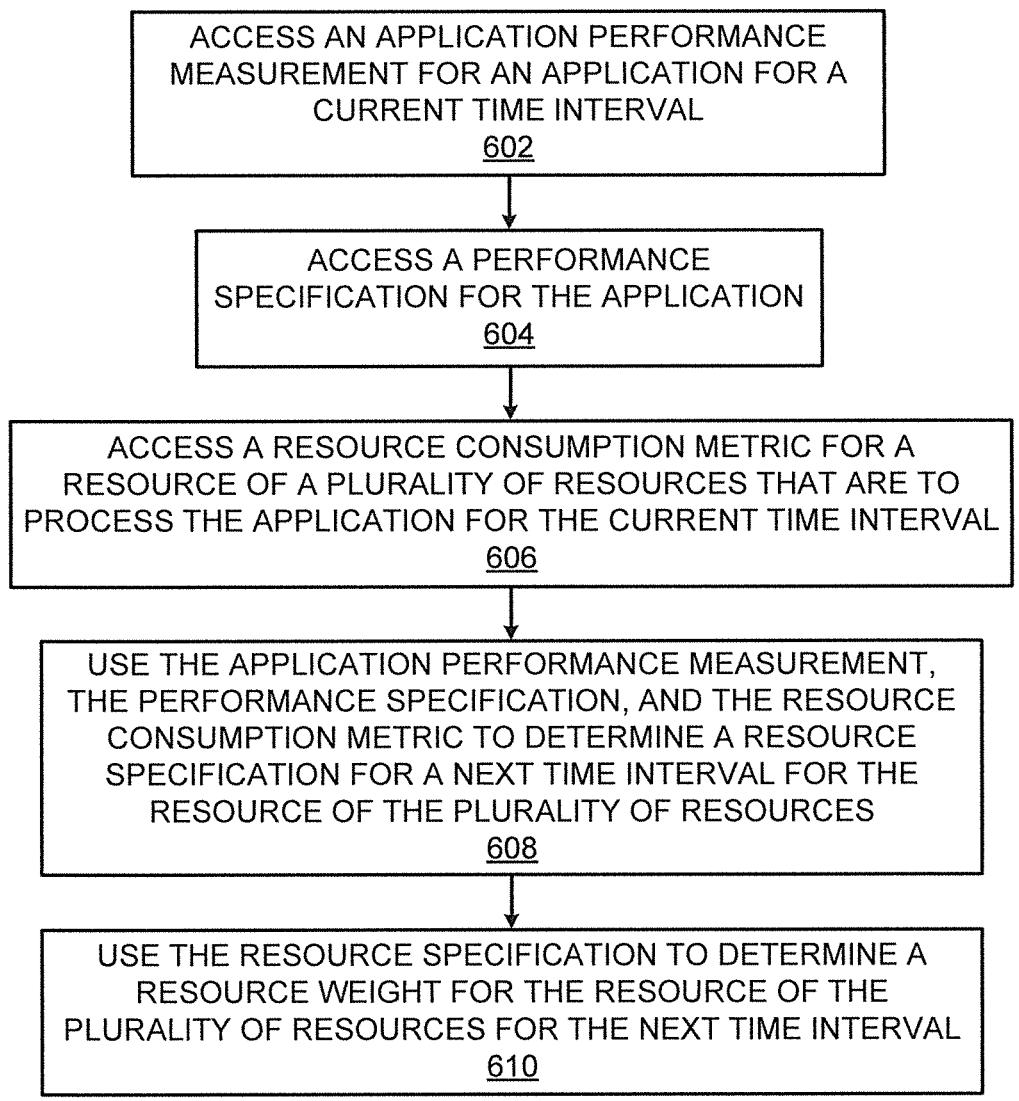
FIG. 6 illustrates a method for weight-based collocation management, according to an example of the present disclosure.
Figure 7:
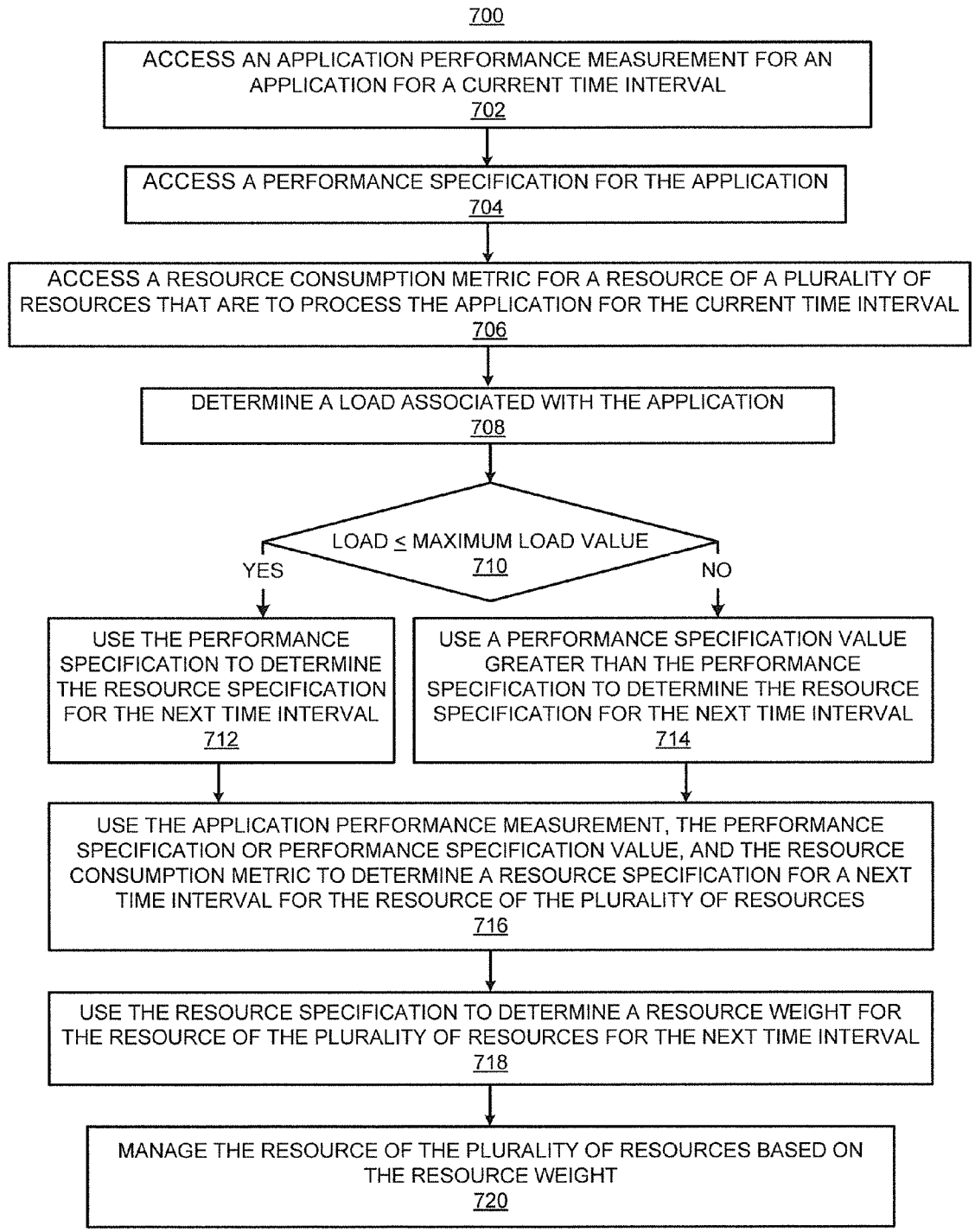
FIG. 7 illustrates further details of the method for weight-based collocation management, according to an example of the present disclosure.

FIGS. 6 and 7 respectively illustrate flowcharts of methods 600 and 700 for weight-based collocation management, corresponding to the example of the weight-based collocation management apparatus 100 whose construction is described in detail above. The methods 600 and 700 may be implemented on the weight-based collocation management apparatus 100 with reference to FIG. 1 by way of example and not limitation. The methods 600 and 700 may be practiced in other apparatus.

Referring to FIG. 6, for the method 600, at block 602, an application performance measurement may be accessed for an application for a current time interval. For example, referring to FIG. 1, the application performance measurement (e.g., one of the application performance measurements 104) may be received for an application (e.g., one of the applications 106) for a current time interval.

At block 604, a performance specification may be accessed for the application. For example, referring to FIG. 1, a performance specification (e.g., one of the performance specifications 112) may be received for the application.

At block 606, a resource consumption metric may be accessed for a resource of a plurality of resources that are to process the application for the current time interval. For example, referring to FIG. 1, a resource consumption metric (e.g., the VM resource consumption 118) may be received for a resource (e.g., one of the high priority VMs 114) of a plurality of resources (e.g., the high priority VMs 114) to process the application for the current time interval.

At block 608, the application performance measurement, the performance specification, and the resource consumption metric may be used to determine a resource specification for a next time interval for the resource of the plurality of resources. For example, referring to FIG. 1, the application performance measurement, the performance specification, and the resource consumption metric may be used to determine a resource specification (e.g., one of the resource specifications 120) for a next time interval for the resource of the plurality of resources.

At block 610, the resource specification may be used to determine a resource weight for the resource of the plurality of resources for the next time interval. For example, referring to FIG. 1, the resource specification may be used to determine a resource weight (e.g., one of the VM resource weights 124) for the resource of the plurality of resources for the next time interval.

Referring to FIG. 7, for the method 700, at block 702, an application performance measurement may be accessed for an application for a current time interval. The application performance measurement may be determined based on a response time (RT) for requests made to the application.

At block 704, a performance specification may be accessed for the application.

At block 706, a resource consumption metric may be accessed for a resource of a plurality of resources that are to process the application for the current time interval.

At block 708, a load associated with the application may be determined. For example, referring to FIGS. 1, 2 and 4, a load associated with the application may be determined by the request rate monitor 400.

At block 710, a determination may be made as to whether the load associated with the application is less than or equal to a maximum load value. Alternatively, a plurality of determinations may be made as to whether loads associated with the application are less than or equal to corresponding load values.

At block 712, if the load is determined to be less than or equal to a maximum load value (e.g., request rate $r_{max}$ at 402 of FIG. 4), the performance specification may be used to determine the resource specification for the next time interval.

At block 714, if the load is determined to be greater than the maximum load value, a performance specification value (i.e., a new value) greater than the performance specification (i.e., the performance specification of block 704) may be used to determine the resource specification for the next time interval.

At block 716, the application performance measurement, the performance specification or the performance specification value as respectively determined at blocks 712 and 714, and the resource consumption metric may be used to determine a resource specification for a next time interval for the resource of the plurality of resources. Determining the resource specification may further include using the application performance measurement and the performance specification (or the performance specification value) to determine a PF for the application for the current time interval, (e.g., see Equation (1)). The PF and the resource consumption metric may be used for a tier of the application for the current time interval to determine the resource specification for the next time interval, (e.g., see Equation (2)). For example, determining the resource specification may further include adding the resource consumption metric for the tier of the application for the current time interval to a product value determined by multiplying the resource consumption metric for the tier of the application for the current time interval times the PF for the application for the current time interval, (e.g., see Equation (2)).

At block 718, the resource specification may be used to determine a resource weight for the resource of the plurality of resources for the next time interval. The VM resource weight for the VM may represent resources allocated to the VM from available resources. Determining the resource weight may include using an available minimum resource weight and an available maximum resource weight to determine the resource weight, (e.g., see Equation (3)). For example, determining the resource weight further may include determining a resource weight value by subtracting an available minimum resource weight from an available maximum resource weight, determining a quotient value by dividing the resource specification for the next time interval by a maximum desired resource specification for the next time interval, determining a product value by multiplying the resource weight value by the quotient value, and adding the product value to the available minimum resource weight, (e.g., see Equation (3)).

At block 720, the resource of the plurality of resources may be managed based on the resource weight. For example, referring to FIG. 1, the resource of the plurality of resources may be managed by the scheduler 126 based on the resource weight.

Figure 8:
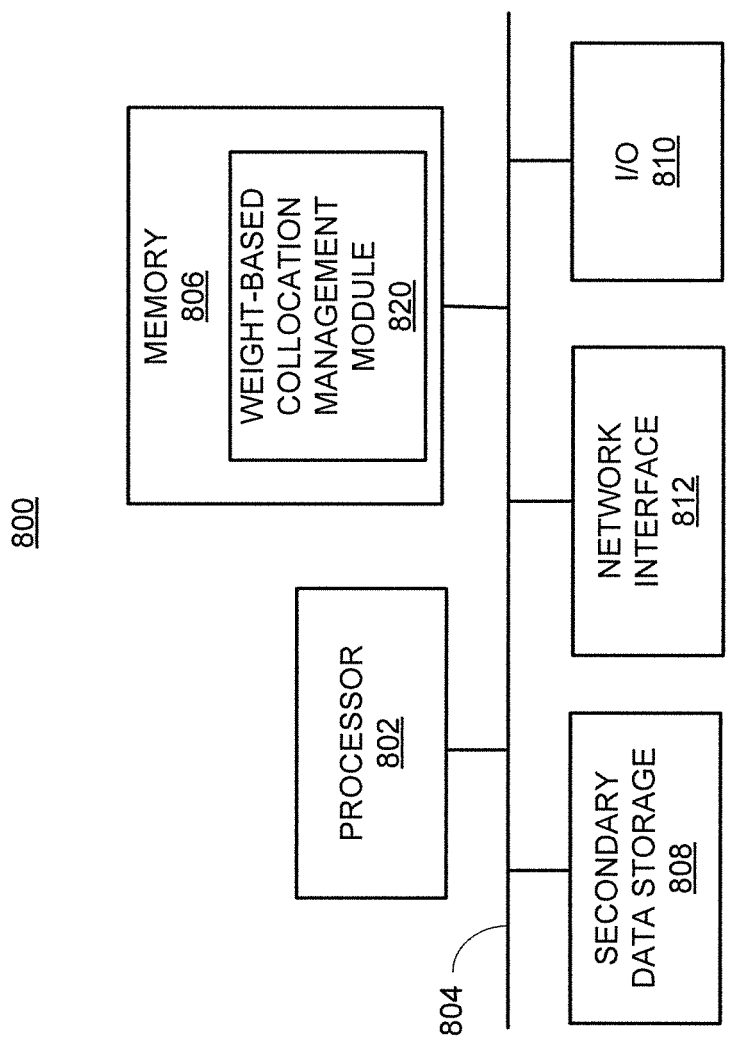
FIG. 8 illustrates a computer system, according to an example of the present disclosure.

FIG. 8 shows a computer system 800 that may be used with the examples described herein. The computer system represents a generic platform that includes components that may be in a server or another computer system. The computer system 800 may be used as a platform for the apparatus 100. The computer system 800 may execute, by a processor or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, memristor arrays, and flash memory).

The computer system 800 includes a processor 802 that may implement or execute machine readable instructions performing some or all of the methods, functions and other processes described herein. Commands and data from the processor 802 are communicated over a communication bus 804. The computer system also includes a main memory 806, such as a random access memory (RAM), where the machine readable instructions and data for the processor 802 may reside during runtime, and a secondary data storage 808, which may be non-volatile and stores machine readable instructions and data. The memory and data storage are examples of computer readable mediums. The memory 806 may include a weight-based collocation management module 820 including machine readable instructions residing in the memory 806 during runtime and executed by the processor 802. The weight-based collocation management module 820 may include the modules 102 and 122 of the apparatus shown in FIG. 1.

The computer system 800 may include an I/O device 810, such as a keyboard, a mouse, a display, etc. The computer system may include a network interface 812 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for weight-based collocation management, the method comprising:
   accessing an application performance measurement for an application for a current time interval;
   accessing a performance specification for the application;
   accessing a resource consumption metric for a resource of a plurality of resources that are to process the application for the current time interval;
   using the application performance measurement, the performance specification, and the resource consumption metric to determine a resource specification for a next time interval for the resource of the plurality of resources; and
   using the resource specification to determine, by a processor, a resource weight for the resource of the plurality of resources for the next time interval.

2. The method of claim 1, further comprising:
   managing the resource of the plurality of resources based on the resource weight.

3. The method of claim 1, wherein the resource of the plurality of resources includes a virtual machine (VM) of a plurality of VMs, the method further comprising:
   managing the VM of the plurality of VMs based on the resource weight.

4. The method of claim 1, wherein accessing the application performance measurement further comprises:
   determining the application performance measurement based on a response time (RT) for requests made to the application.

5. The method of claim 1, wherein determining the resource specification further comprises:
   using the application performance measurement and the performance specification to determine a performance factor (PF) for the application for the current time interval.

6. The method of claim 5, wherein determining the resource specification further comprises:
   using the PF and the resource consumption metric for a tier of the application for the current time interval to determine the resource specification for the next time interval.

7. The method of claim 6, wherein determining the resource specification further comprises:
   adding the resource consumption metric for the tier of the application for the current time interval to a product value determined by multiplying the resource consumption metric for the tier of the application for the current time interval times the PF for the application for the current time interval.

8. The method of claim 5, wherein the PF includes a range from $-1$ to $+\infty$.

9. The method of claim 1, wherein determining the resource weight further comprises:
   using an available minimum resource weight and an available maximum resource weight to determine the resource weight.

10. The method of claim 1, wherein determining the resource weight further comprises:
    determining a resource weight value by subtracting an available minimum resource weight from an available maximum resource weight;
    determining a quotient value by dividing the resource specification for the next time interval by a maximum desired resource specification for the next time interval;
    determining a product value by multiplying the resource weight value by the quotient value; and
    adding the product value to the available minimum resource weight.

11. The method of claim 1, further comprising:
    determining a load associated with the application;
    if the load is less than or equal to a maximum load value, using the performance specification to determine the resource specification for the next time interval; and
    if the load is greater than the maximum load value, using a performance specification value greater than the performance specification to determine the resource specification for the next time interval.

12. The method of claim 11, wherein the load value is a request rate associated with the application.

13. The method of claim 1, wherein determining the resource specification further comprises:
    using the application performance measurement and the performance specification to determine a performance factor (PF) for the application for the current time interval, wherein the application performance measurement is based on a response time (RT) for requests made to the application.

14. The method of claim 1, wherein determining the resource weight further comprises:
    determining a resource weight value by subtracting an available minimum resource weight from an available maximum resource weight;
    determining a quotient value by dividing a minimum desired resource specification for the next time interval by the resource specification for the next time interval;
    determining a product value by multiplying the resource weight value by a value that includes the quotient value; and
    adding the product value to the available minimum resource weight.

15. A weight-based collocation management apparatus comprising:
    a memory storing machine readable instructions to:
        access an application performance measurement for an application for a current time interval;
        access a performance specification for the application;
        access a virtual machine (VM) resource consumption metric for a VM of a plurality of VMs that are to process the application for the current time interval;
        use the application performance measurement, the performance specification, and the VM resource consumption metric to determine a resource specification for a next time interval for the VM of the plurality of VMs; and
        use the resource specification to determine, by a processor, a VM resource weight for the VM of the plurality of VMs for the next time interval; and
    a processor to implement the machine readable instructions.

16. The weight-based collocation management apparatus of claim 15, wherein determining the resource specification further comprises machine readable instructions to:
    use the application performance measurement and the performance specification to determine a performance factor (PF) for the application for the current time interval.

17. The weight-based collocation management apparatus of claim 15, further comprising machine readable instructions to:
    determine a load associated with the application;
    if the load is less than or equal to a maximum load value, then use the performance specification to determine the resource specification for the next time interval; and if the load is greater than the maximum load value, then use a performance specification value greater than the performance specification to determine the resource specification for the next time interval.

18. A non-transitory computer readable medium having stored thereon machine readable instructions to provide weight-based collocation management, the machine readable instructions, when executed, causes a computer system to:
- access an application performance measurement for an application for a current time interval;
- access a performance specification for the application;
- access a virtual machine (VM) resource consumption metric for a VM of a plurality of VMs that are to process the application for the current time interval;
- use the application performance measurement, the performance specification, and the VM resource consumption metric to determine a resource specification for a next time interval for the VM of the plurality of VMs;
- use the resource specification to determine a VM resource weight for the VM of the plurality of VMs for the next time interval, wherein the VM resource weight for the VM represents resources allocated to the VM from available resources; and
- manage, by a processor, the VM of the plurality of VMs based on the resource weight.

* * * * *